Oct. 5, 1926.　　　　　　　　　　　　　　　　　　1,602,210
G. J. RATHBUN ET AL
INTERNAL COMBUSTION ENGINE
Filed July 29, 1920　　　　2 Sheets-Sheet 1
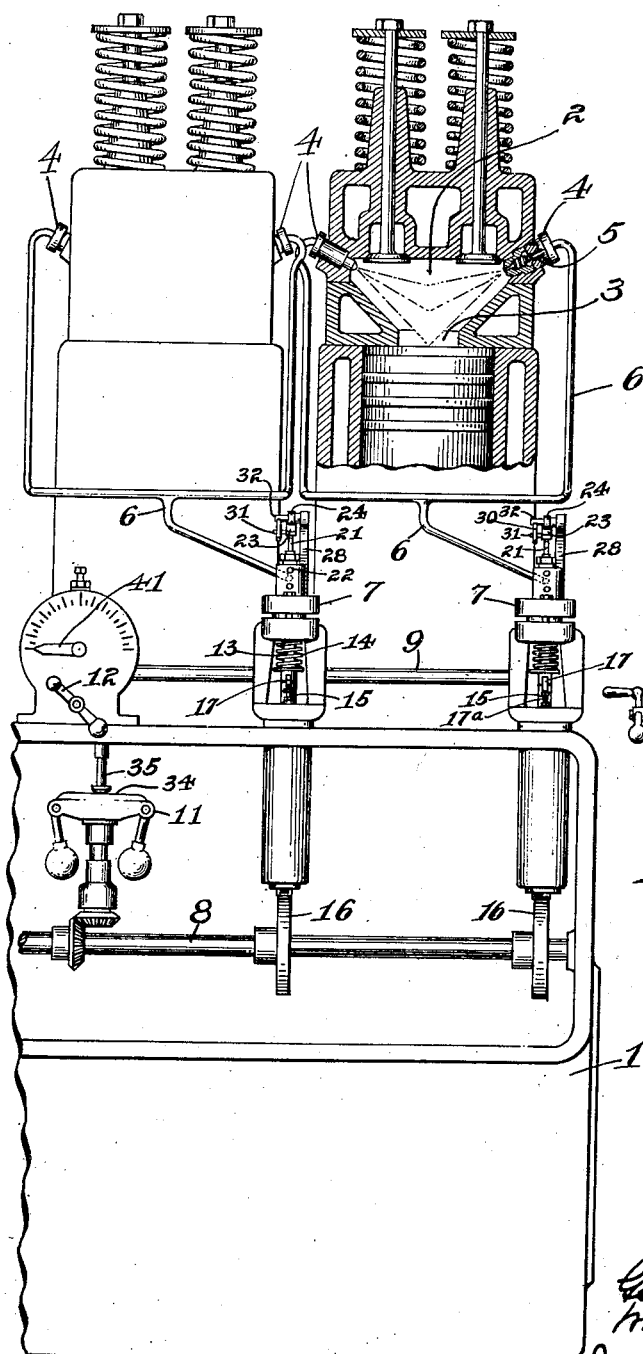
Fig. 1,
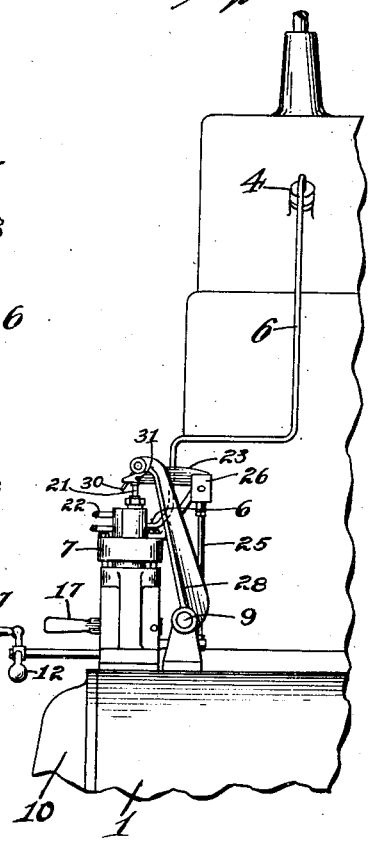
Fig. 2,
INVENTOR
George J. Rathbun
William T. Price
BY
Jeffrey Kimball Eggleston
ATTORNEYS

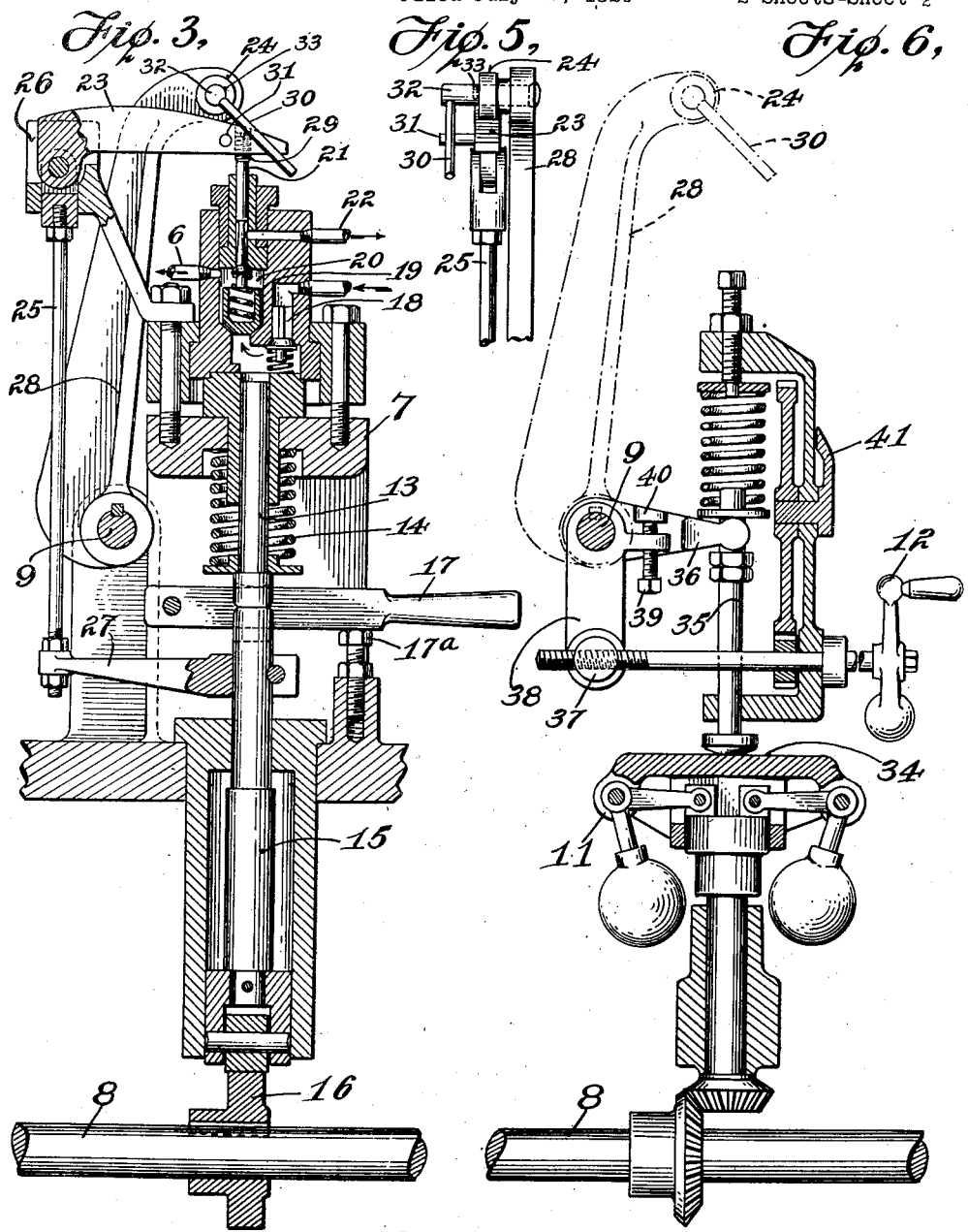

Patented Oct. 5, 1926.

1,602,210

UNITED STATES PATENT OFFICE.

GEORGE J. RATHBUN, OF TOLEDO, OHIO, AND WILLIAM T. PRICE, OF EASTON, PENNSYLVANIA, ASSIGNORS TO PRICE ENGINE CORPORATION, OF NEW YORK, N. Y., A CORPORATION OF NEW YORK.

INTERNAL-COMBUSTION ENGINE.

Application filed July 29, 1920. Serial No. 399,933.

The invention is an improvement in the regulation of injection type internal combustion engines particularly those in which liquid fuel is injected by pump during the compression stroke, and without the use of injection air, and provides a simple means for graduating the amount of the injected charge to maintain efficient combustion operation under varying conditions of speed and load. The invention also concerns the regulation and adjustment of multi-cylinder injection type engines whereby each cylinder may be accurately set for equal operation with the others, and whereby a common control, by hand or governor, may simultaneously and equally vary the fuel injection to all the cylinders; and it further concerns other features of operation and construction which will be hereinafter made apparent.

The principles of the invention are illustrated in the accompanying two sheets of drawings in connection with a type of engine in which it is preferred but to which its use is not limited. In these drawings, Fig. 1 shows in elevation a sufficient portion of one end of a vertical multi-cylinder engine to illustrate the regulation system, the end cylinder being shown partly in section.

Fig. 2 is an end elevation of a portion of Fig. 1.

Fig. 3, a vertical section of one of the fuel pumps and its associated parts.

Fig. 4 being a detail of the pump cam.

Fig. 5 is a detail end elevation of the shifting fulcrum arm and its associated parts, and Fig. 6, a section through the governor and the hand control.

In the engine shown, the several cylinders are mounted on a common base or crank case 1, and each comprises a water-jacketed or equivalently cooled compression space 2 connected to the piston space by a restricted opening 3, and provided with opposed fuel injection nozzles 4, the latter being located at opposite ends of the combustion space, which is oblong, and arranged to inject their sprays into mutual impingement. These nozzles are identical in structure and adapted to inject the fuel in a very finely atomized condition without air, and each contains a small spring-seated check valve 5 opening in the direction of flow and intended to close promptly against the back pressure in the combustion space. In the case of a four-cycle engine, the combustion space is provided with exhaust and intake valves as indicated, these being operated by any suitable gearing omitted from the drawings for convenience of illustration. The two injection valves of each cylinder are connected to the delivery pipe 6 of a fuel pump 7 of which there is one for each cylinder, all mounted on the crank case directly over the cam shaft 8, which operates them and directly in front of a control shaft 9 which controls their respective fuel deliveries. Both of these shafts are common to all the cylinders of the engine. The cam shaft 8 is journalled within the crank case and driven in some suitable way from the crank shaft as will be understood; it appears in Fig. 1 through the access opening from which, in this figure, the cover plate 10 (shown in Fig. 2) has been removed. The control shaft 9 is a rock shaft appropriately journalled on the exterior of the crank case and at some convenient point in its length it is connected with the governor 11, and also with the hand control crank 12. It is adapted for operation by either of these devices to the end of simultaneously controlling the fuel deliveries from all of the injection pumps thereby controlling the engine speed. The governor is driven by bevelled gears from the cam shaft 8 but may obviously be designed, mounted and driven in any suitable way.

Each fuel pump comprises a pump plunger 13 operated by a pump spring 14 and a cam follower 15, which latter is provided with a roller engaged by a pump cam 16 fixed to the cam shaft 8. The detail of the pump structure and its manner of operation may be as desired, but it should be designed for delivering fuel at a pressure of several thousand pounds so as to produce fine atomization at the nozzles. It is equipped with a hand lever 17 for operating it by hand when desired, and a set screw 17ª serves as an adjustable stop for the hand lever, and also serves to limit the suction stroke of the plunger as will be apparent. The pump draws in fuel through a suction valve 18 and discharges it through a discharge valve 19 into a delivery chamber 20 whence some of it passes to the fuel delivery pipe 6 leading to the injection nozzles and the remainder passes through an escape or overflow valve 21 to an overflow pipe 22 by which it is returned to the main source of supply. The escape valve is seated, in the present case, by the same spring that seats the delivery valve 19, and is opened by a lever 23 which finds its fulcrum on a roller 24 and which is operated by a pivotal connection with a push rod 25. This push rod is slidingly supported at its upper end in a fixed bracket 26 and is attached at its lower end to a bracket arm 27 secured to the pump cam follower 15 or to some other part operating in like phase so that the lever 23 will be rocked on its fulcrum 24, and in the direction to open the escape valve, on each pump stroke. The length of the push rod is adjustable by means of its threads and nuts as indicated.

It will be apparent that if the escape valve is opened early in the pump stroke, very little fuel will be discharged through the pipe 6 to the injection nozzles, because most of it will find a ready outlet past the escape valve to the overflow pipe 22 and if opened later, correspondingly larger amounts will be discharged to the injection nozzles. Variation in the time of opening of the escape valve thus controls the amount of the injected charge and in operation such variation is produced by shifting the position of the fulcrum roller 24 along the length of the escape valve lever 23 and for this purpose that roller is mounted on the upper end of the swinging arm 28, which is fast to the control shaft 9 above referred to and adapted to be operated by it. Somewhere in the train of mechanism between the pump plunger and the escape valve, there is provided a certain amount of lost motion and in the present case it occurs between the upper curved surface of the escape valve lever 23 and its fulcrum 24. As the cam follower 15 is making its pumping stroke, the escape valve lever 23 becomes effective to open the escape valve only after its said upper surface has engaged its fulcrum roller 24, and it will obviously engage it earlier or later according as the fulcrum roller is near to or distant from its pivotal connection with the push rod 25 so that the angular position of the rock shaft 9 and its arms 28 thus controls the size of the charges that are injected into each cylinder of the engine. The upper surface of the escape valve lever is curved, preferably on an arc having a radius equal to that of controller arm 28, and by adjusting the contact screw 29 by which it engages the valve, or the length of the push rod 25, or both, the said surface may be brought into any desired relation to the fulcrum roller so that the extent of the lost motion and hence the time of opening of the escape valve of each pump and for all positions of the fulcrum roller can be accurately adjusted to the results desired. In adjusting for light loads the control shaft 9 is manipulated to place all the fulcrum rollers 24 near the push rod ends of their valve levers in which position the escape valves are opened early in the pump stroke (representing the delivery of only a small amount of fuel to the injection nozzles) and the length of the push rods is then adjusted to give the proper charge to each cylinder under that condition of load. Under heavier loads, the fulcrum rollers are shifted toward the escape valves so that the latter will be opened later in the stroke, (representing a correspondingly larger fuel delivery) and then the contact screws 29 are adjusted so that escape valve opens at the proper time under this condition and so that all the cylinders will fire alike. By giving the appropriate curvature to the fulcrum surface of lever 23, and by appropriately adjusting the horizontal angle thereof, in the manner just described, the time of opening the escape valves for all intermediate fulcrum positions or speeds follows from the two adjustments just referred to, so that all the cylinders of the engine can thus be made to function uniformly throughout the whole range from idling to full load. The mechanism described provides idling and full load adjustments, so related as to govern also the intermediate load conditions in proportion, and it will be apparent that these adjustments will produce extremely close equality in the action of all the cylinders, and it will be further apparent that this mechanism may be employed with various forms of pump control although its use with the escape valve above referred to, and more especially with the particular form of such valve about to be described offers certain advantages and is preferred.

It has been determined in the case of airless injection type engines adapted to operate under varying loads, that the manner of terminating the fuel injection, i. e. of opening the overflow path from the delivery chamber 20 of the pump, exercises an important influence on the character of the combustion. With heavier loads, and consequently heavier charges of fuel, the rate of relief of the pressure in said chamber should be relatively slow and with lighter loads, relatively rapid, and this effect is also obtained in the mechanism above described, for it will be apparent that the escape valve will be opened more slowly (in relation to the velocity of the pump stroke) when the fulcrum roller 24 is in its heavy load or right-hand position than when at a lower load position. Moreover, it has been determined that the rate of opening of the escape orifice should preferably be co-related within certain definite limits in relation to the value of the injected charge to the end of securing smoothness of operation and clean exhaust under varying loads and speeds. This is a subject which has been explained and claimed in Patent No. 1,508,722 granted September 16, 1924, on a prior application by W. T. Price filed December 31, 1919, No. 348,703, wherein the appropriate rate of opening of the escape path was obtained by a rather elaborate leverage system which involved imparting extremely minute movement to a small poppet valve of ordinary form constituting the escape valve in that case. By such carefully regulated movement the pressure in the injection nozzle is released at such rate as to produce a substantially instantaneous cessation of the fuel spray without dribbling and also without permitting the entry or formation of gases in the nozzles, as we believe, so that each injection is in the form of finely atomized spray only and reliably conforms to the setting of the pump-controlling members and thereby gives a maximum fuel economy for such setting, that is to say, an efficiency at low loads more nearly approximating that at full load. The present invention accomplishes the same result without the delicateness of structure inherent in the arrangement of the said application, and does this by forming the stem of the escape valve 21, with a taper as shown in Fig. 3, the maximum diameter of the taper immediately adjacent to its poppet head, forming a fairly close fit in the valve seat. With such taper, a relatively large motion of the escape valve results in but a small change in the effective area of the escape opening and with proper design of taper of the valve stem, the rate at which this opening is changed, can be very easily made to conform to the principles set forth in said prior application and with even a greater degree of accuracy, for but a single lever is required and the valve may receive a considerable movement, substantially of the same order as that of the pump plunger itself, which means that liability of derangement is reduced to a minimum and the ease and accuracy of adjustment are greatly enhanced. It will be understood that when a tapered relief or escape valve is employed in regulation systems as just described the angle of the taper is laid out with reference to the range of leverage ratios provided by the lever 23 and to the velocity of the cam follower, and that in the case of other systems of injection pump control its design will be modified accordingly and so as to control the rate of change of area of the escape path in any manner that may be required.

It will be apparent also that inasmuch as the primary function of the escape valve is to furnish an escape for fuel from the pump, it will be entirely consonant with this invention if it also has other functions, for example, the function of an intake valve for the pump. It is desirable to give the valve a poppet head as shown for the complete closure of the escape path.

The engine shown is equipped with a fuel cut-off consisting of an oblique finger 30 acting as a cam and adapted to strike a lateral stud 31 on the escape valve lever 23 and open the escape valve, or hold it open, whenever the control arm 28 is swung to its extreme position in the direction to reduce the fuel injection. Such action results in the escape through the overflow pipe 22 of the full stroke volume of the pump and in no delivery to the injection nozzles and therefore stops the engine. The fulcrum roller 24 is normally retained in working position on its stud shaft 32 by a spring detent 33, and this is arranged so that it can be depressed by hand whenever desired to enable the roller to be slid along the stud, out of alignment with the escape valve lever, and so that the latter is thus deprived of its fulcrum. Consequently the escape valve is not opened and the pump delivers a maximum charge into its engine cylinder whenever this change is made.

Referring now to Fig. 6, it will be apparent that the change of position of the governor collar or plate 34 will operate against the governor spring, through the push rod 35 and the crank arm 36 on the control shaft 9, to rock the latter and thereby shift the positions of all of the fulcrum rollers 24 accordingly. The form of operating connection for this purpose may be constructed in a variety of different ways to produce this effect, and all of the usual adjustments are to be understood as present in the construction illustrated. The control of the rock shaft 9, however, is dominated by the control crank 12, the shaft of which is threaded to a swivelled nut 37 carried in a bell crank 38, independently journalled on the rock shaft 9 and carrying a thrust screw 39 adapted to engage a lug 40 on the crank arm 36 or any other member in the line of governor control. By this means the operator may positively shift the fulcrum rollers 24 in the direction to diminish the fuel injection and may, contra, limit the extent to which they are permitted to return under the pressure of the spring. A pointer 41 geared to the shaft of the control crank 12 indicates the position of the hand crank control. In cases where governors are not required any simple form of hand control on the rock shaft 9 will obviously suffice for all the purposes of engine regulation and can be interlocked in any of the usual ways with reversing and starting means as will be understood. The regulation system herein described and especially the tapered escape valve is peculiarly adapted for use in injection type engines wherein the whole or at least the maximum part of the fuel injection occurs during the compression stroke and prior to compression dead center and wherein ignition results from the compression of a mixture of air and injected fuel spray, and its use in this particular type of engine is therefore a part of this invention.

Claims—

1. Fuel regulation for airless injection type engines comprising a fuel injecting pump, and an escape therefrom adapted to be opened at variable times during the pump stroke and comprising a valve seat and a tapered stem valve member co-acting therewith to vary the cross area of the escape path.

2. Fuel regulation for injection type engines comprising a fuel injecting pump and an escape valve therefor consisting of a poppet valve having a tapered stem which co-acts with the valve seat to vary the cross area of the escape path through the valve.

3. Fuel regulation for airless injection type engines comprising in combination, a fuel injection pump having an escape valve whereby its delivery is varied, and means for operating said escape valve comprising a lever operatively connected to the engine and having a relatively shiftable fulcrum, means associated with the work end of said lever for varying its relation to said pump, and means associated with the power end for varying its relation to its operating means.

4. Fuel regulation for injection type engines comprising in combination an upright fuel injection pump mounted on the engine housing above the top of the crank case and having an escape valve, and means for operating said escape valve comprising an upright push rod slidably mounted for straight line movement in a bracket fixed to the engine housing, said push rod being operatively connected to the engine for bodily reciprocation during the pump stroke, a lever pivoted at one end to the upper end of the push rod extending transversely therefrom, operatively connected with the escape valve and having a longitudinally extending curved surface, an upright control arm mounted for rocking movement on an axis located below the pump and parallel with the pivotal axis of the lever, a fulcrum roller supported by said control arm in opposition to the curved surface of said lever and means to rock said control arm in either direction to move the fulcrum member along said curved surface thereby controlling the operation of the lever and in consequence that of the pump.

5. Fuel regulation for injection type engines comprising in combination a fuel injection pump, an escape valve therefor, a lever operatively associated with said escape valve and operatively connected to the engine for operation during the pump stroke, said lever having a curved surface extending lengthwise of the lever, a rocking control arm having its axis below the escape valve and carrying a fulcrum member for co-operation with said curved surface, and means for rocking the control arm to carry the fulcrum member along said surface.

6. Fuel regulation for injection type engines comprising in combination a fuel injection pump having an escape valve, and means for operating said escape valve comprising a lever operatively connected to the engine and having a curved rocker surface of long radius, a shiftable fulcrum member opposed to said curved surface and means for supporting said fulcrum member and for moving it along a path of substantially similar curvature.

7. In fuel regulation for multi-cylinder engines of the injection type, a cam shaft in the crank case, a rock shaft parallel thereto mounted on the engine housing above the top of the crank case, an upright pump for each cylinder mounted on the engine housing adjacent said shafts for operation by its respective cam on said cam shaft, each said pump having an escape valve, a lever associated with each escape valve for operating the same, said lever being operatively connected with the engine for operation during the pump stroke, upstanding control arms, one for each pump, mounted on said rock shaft and carrying fulcrum members for co-operation with the respective levers, and manual and governor-controlled means for operating said rock shaft to control the position on the fulcra of the respective levers and the operation of the escape valves, and thereby that of the several pumps.

8. In a multi-cylinder injection type engine, a cam shaft, upright pumps mounted on the engine housing over the top of the crank case adjacent each cylinder for actuation by cams on said cam shaft, a longitudinal rock shaft mounted above the crank case below the tops of said pumps, an upstanding control arm mounted on said rock shaft adjacent each pump, an escape valve for each pump, an operating lever for each escape valve having its pivotal axis parallel to that of the rock shaft, said lever being operatively connected to the engine for synchronous operation with the pump, and extending transversely, each of said control arms extending above the corresponding escape valve operating lever and carrying a fulcrum member therefor, and means for rocking the shaft and simultaneously carrying the various arms into positions determining the relation of the fulcrum members to the respective escape valve operating levers.

9. In a multi-cylinder injection type engine, an upright fuel injection pump for each cylinder mounted on the engine housing, an escape valve for each pump, an operating lever for each escape valve, a support for each such lever operatively connected to the engine for reciprocation in phase with the pump stroke, upright control rock arms supported behind the pumps, one for each of said operating levers extending upwardly and forwardly above said levers and opposing to said operating lever a shiftable fulcrum roller located above the lever and means for rocking said arms to varying the location of the fulcrum roller with reference to its lever.

10. In a multi-cylinder injection type engine, a fuel injection pump for each cylinder, an escape valve for each pump adapted to be opened at variable times in the pump stroke, an operating lever for each escape valve, a control arm for each lever opposing a fulcrum member thereto and having an oblique finger for cooperation with said lever in the extreme position of control movement in the direction of fuel discharge reduction, and means for rocking said control arms into said position to hold open the escape valves and stop the engine.

11. In a multi-cylinder injection type engine, a fuel injection pump for each cylinder, an escape valve for each pump, an escape valve operating lever for each escape valve operatively connected to the engine and to said valve, a movable control arm for each escape valve operating lever carrying thereon the fulcrum member of the lever, and additional means carried by said control arms adapted to coact with said levers to further operate them and thereby cut off the fuel injection and stop the engine.

12. In a multi-cylinder injection type engine, a fuel injection pump for each cylinder, an escape valve for each pump, a pair of control members for each escape valve, one member comprising an escape valve operating lever operatively connected to the engine and to said valve, and the other member comprising means for shifting the fulcrum of each escape valve operating lever, one member of each of said pairs of members being also provided with cam means adapted to coact with the other member of said pair to further operate the lever and thereby cut off the fuel injection and stop the engine.

13. Fuel regulation for injection type engines comprising in combination a fuel injection pump having an escape valve, and means for operating said escape valve comprising a support operatively connected to the engine for reciprocation thereby synchronously with said pump, a lever pivoted on said support and having a part operatively connected to said escape valve, a fulcrum member for said lever opposed thereto, a movable support for said fulcrum member, means for controlling the position of the fulcrum member support, and means whereby the fulcrum member is capable of being moved out of operative relation to said lever.

14. Fuel regulation for injection type engines comprising in combination a fuel injection pump having an escape valve, and means for operating said escape valve comprising a support operatively connected to the engine for reciprocation thereby synchronously with said pump, a lever pivoted on said support and having a part operatively connected to said escape valve and a roller constituting a quickly disabled fulcrum for said lever, said roller being movable axially out of operative relation to the lever thus exempting the cylinder from control.

15. Fuel regulation for injection type engines comprising in combination a fuel injection pump mounted on the top of the crank case, an escape valve for the pump, a push rod behind the pump operatively connected to a moving part of the pump and mounted to slide in a fixed guide, a lever pivoted to the end of said push rod and projecting forward into operative relation to the escape valve, a control rock arm mounted on an axis located behind and below the escape valve and above the top of the crank case and in advance of the push rod, said arm extending above the lever, a fulcrum member carried by the control arm in opposition to said lever to sustain it against the thrust of the push rod, and means for shifting the control arm.

16. Fuel regulation for injection type engines comprising in combination a fuel injection pump mounted on the top of the crank case adjacent its front edge and having its vertical axis in a plane including the cam shaft axis, an escape valve for the pump, a push rod behind the pump operatively connected to a moving part of the pump and mounted to slide in a fixed guide on the pump structure, a lever otherwise free pivoted at its rear end to the end of said push rod and projecting forward over the pump structure into operative relation to the escape valve, and a control rock arm mounted behind the pump above the top of the crank case and in advance of the push rod and extending above the lever, a fulcrum member carried by the control arm in opposition to said lever to sustain it against the thrust of the push rod, and means for shifting the control arm.

17. In fuel regulation for multicylinder engines of the injection type, a cam shaft, an upright pump for each cylinder mounted on the engine housing adjacent said shaft for operation by its respective cam on said shaft, each said pump having an escape valve, a lever associated with each escape valve for operating the same, said lever being operatively connected with the engine for operation during the pump stroke, a rock shaft parallel with the cam shaft and located below the escape valves, control arms, one for each pump, mounted on said rock shaft and extending upward and forward above said escape valve levers and carrying each a fulcrum member for cooperation with the respective levers, and means for operating said rock shaft to control the position of the fulcra of the respective levers and the operation of the escape valves, and thereby that of the several pumps.

In testimony whereof, we have signed this specification.

GEORGE J. RATHBUN.
WILLIAM T. PRICE.